Dec. 2, 1947.　　　H. LOMBARD　　　2,431,698
REMOVABLE MOUNTING INSTALLATION
Filed Dec. 16, 1944　　　3 Sheets-Sheet 1
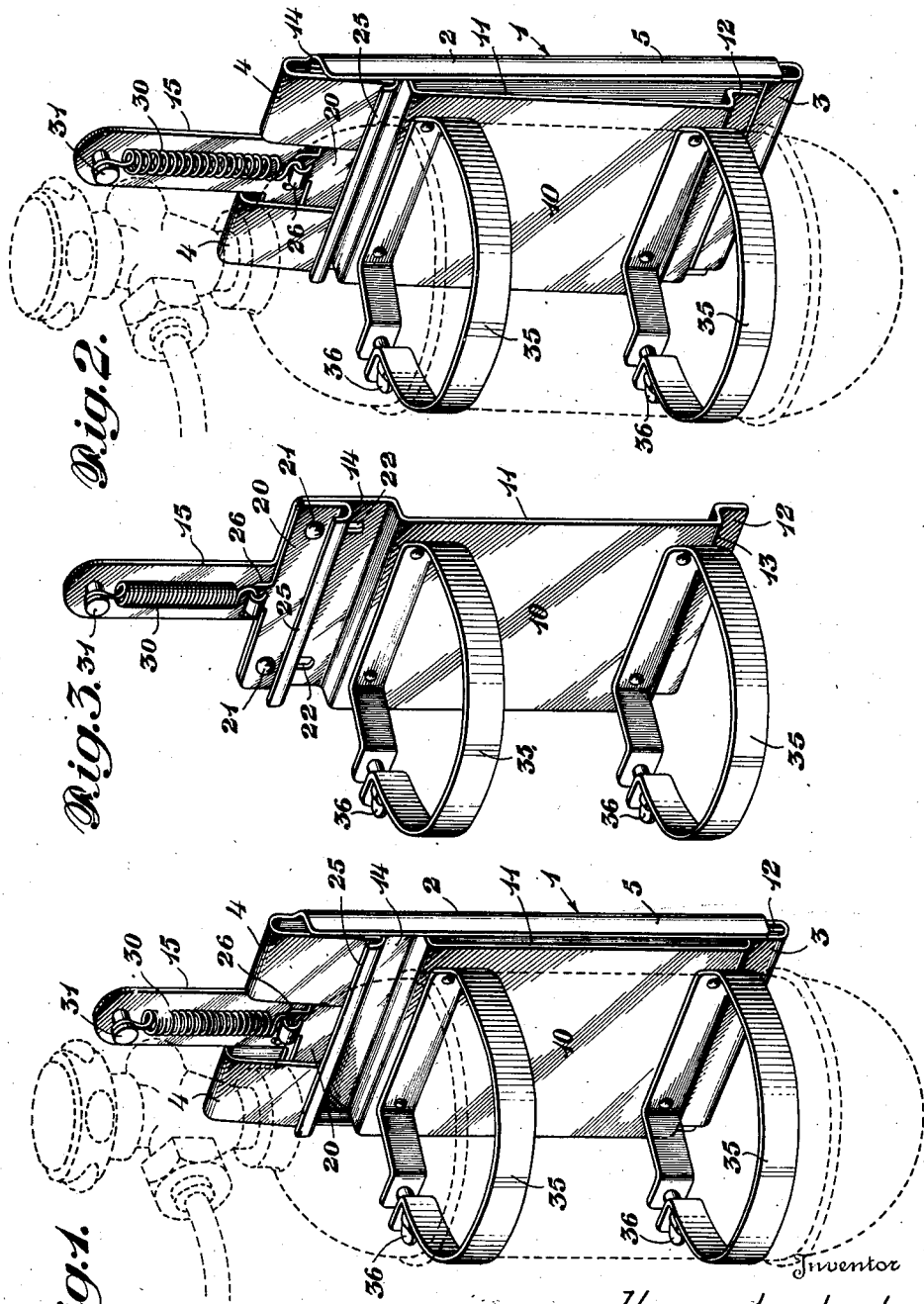
Inventor
Herman Lombard
By
Attorney

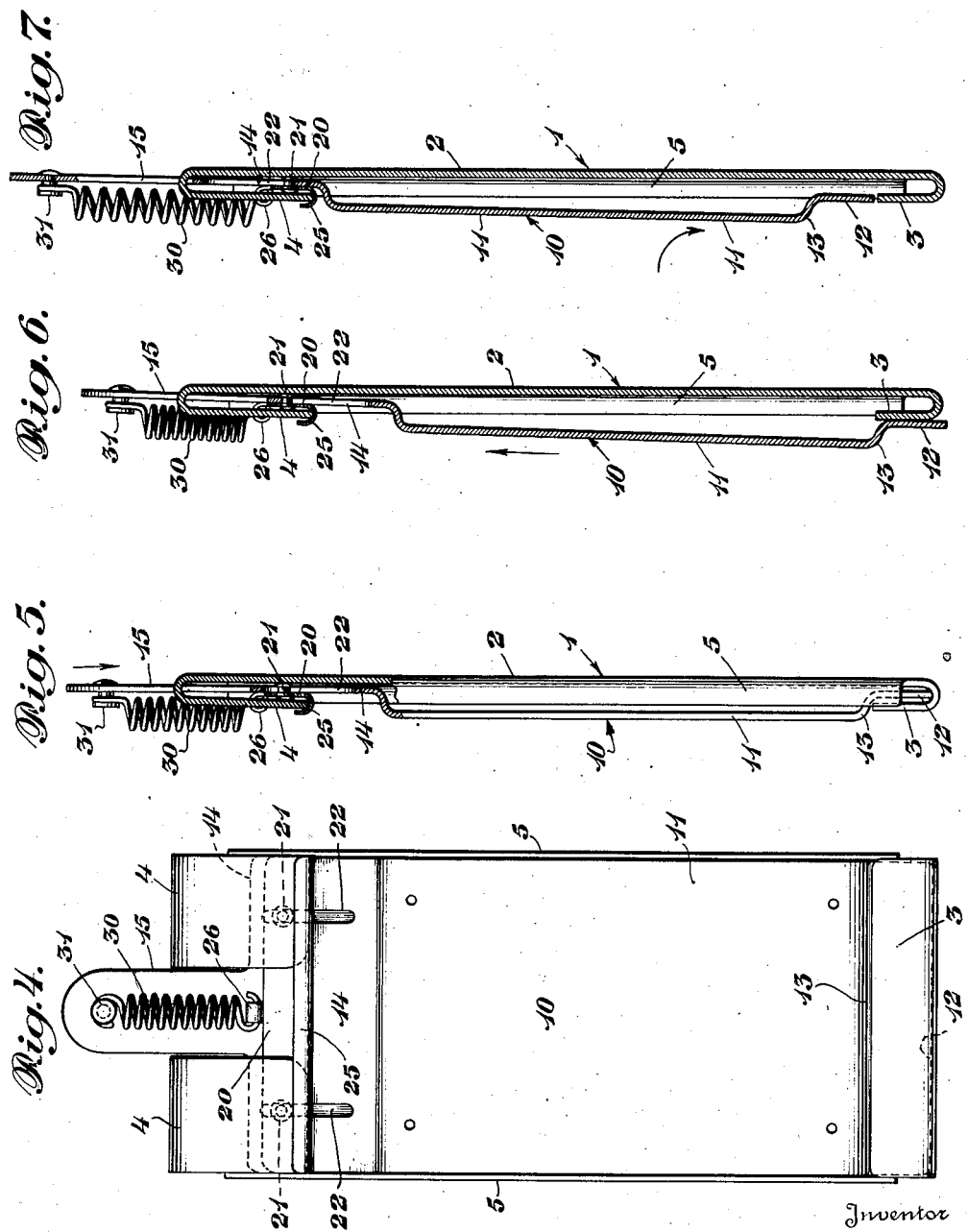

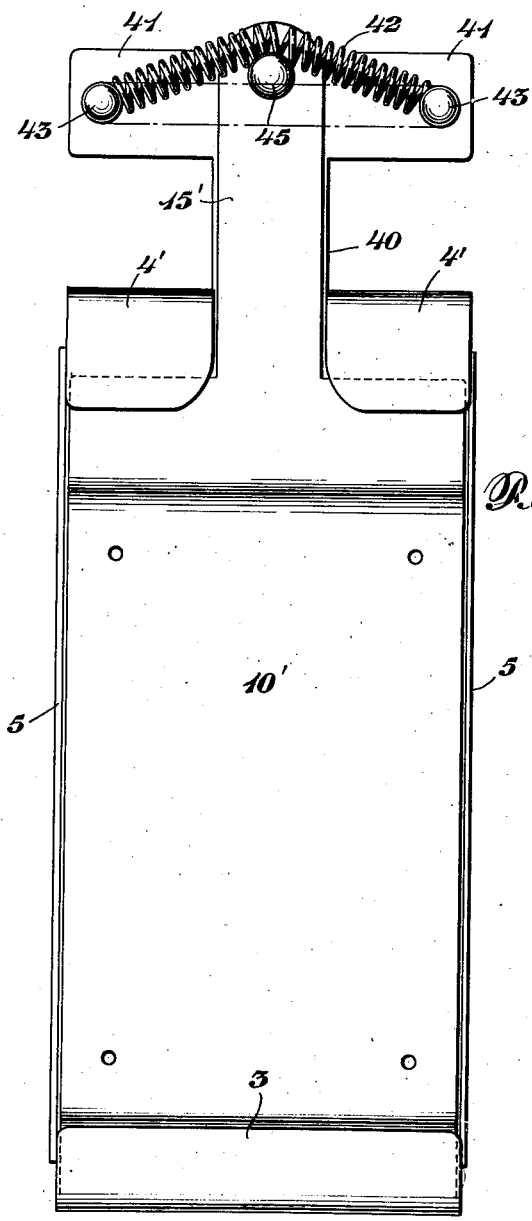
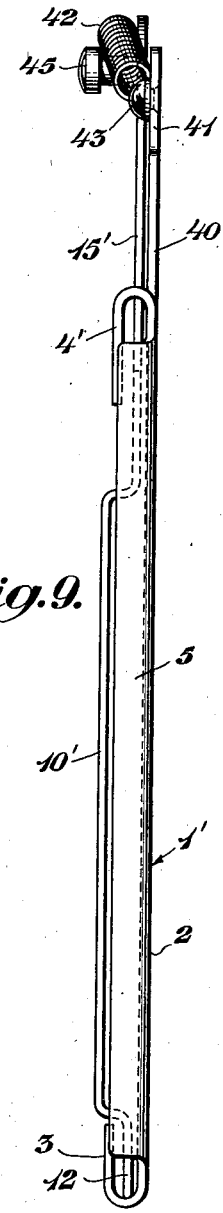

Patented Dec. 2, 1947

2,431,698

UNITED STATES PATENT OFFICE 2,431,698

REMOVABLE MOUNTING INSTALLATION

Herman Lombard, United States Navy

Application December 16, 1944, Serial No. 568,527

8 Claims. (Cl. 248—311)

(Granted under the act of March 3, 1883, as amended April 30, 1928; 370 O. G. 757)

This invention relates, in general, to an improved mounting assembly for removably supporting an object in an installation and deals, more particularly, with a device of this character that comprises separable component parts by which a portable apparatus, such as an oxygen cylinder, fire extinguisher, or the like, may be readily mounted in position for a desired use or easily and quickly dismounted when necessary for another use or for maintenance and repair purposes.

A primary object of the invention is to provide a simplified compact mounting assembly composed of a pair of cooperating, interfitting bracket and supporting members in combination with an automatic retaining means for locking the assembly in mounted position against accidental or unintended removal.

A further object of the invention is to provide such a mounting assembly in which the retaining means has an automatic self-locking action and is under a continuous spring force by which the parts of the assembly are held in rigid engagement against vibration and jarring effects and yet capable of ready release when dismounting of the assembly is desired.

Another object of the invention is for the provision of a mounting assembly of this character wherein the cooperating bracket and supporting members include a pilot or guide means by which interfitting of these members in a mounting operation is accomplished with ease and facility without the use of tools or additional equipment.

Still another object of the invention is to provide a mounting assembly of the kind described in which the spring actuated retaining means for the assembly is associated with the pilot or guide means in a manner to effect an automatic locking of the supporting member with the bracket member in article mounting position.

A further object of the invention is to provide a mounting assembly which incorporates all the foregoing features in a simple and compact design that is strong and durable and may be produced at comparatively low cost in that it requires only a minimum number of parts and relatively few operations in the manufacture thereof.

With such objects in view, as well as other advantages which may be incident to the use of the improvements, the invention consists of the parts and combinations thereof hereinafter set forth and claimed with the understanding that the several necessary elements constituting the same may be varied in proportions and arrangement without departing from the nature and scope of the invention as defined in the appended claims.

In order to make the invention more clearly understood there are shown in the accompanying drawings, means for carrying the invention into practical effect, without limiting the improvements in their useful application to the particular construction and arrangement which, for the purpose of explanation, have been made the subject of illustration.

In the accompanying drawings:

Fig. 1 is a perspective view showing the complete mounting assembly of the invention in an installation for mounting an article, such as an oxygen cylinder or the like, represented by dotted lines;

Fig. 2 is a similar view showing the article supporting member in position for connection to the bracket member;

Fig. 3 is a perspective view of the article supporting member per se;

Fig. 4 is a front elevational view of the complete mounting assembly;

Fig. 5 is a side view of Fig. 4 with parts broken away to illustrate the retaining means for maintaining the assembly in article mounting position;

Fig. 6 is a sectional view showing the article supporting member as initially applied to the bracket member; and, Fig. 7 is a similar view showing the further application of the article supporting member to the bracket just prior to the final application thereof to the mounted position of the assembly shown in Figs. 4 and 5.

Fig. 8 is front elevational view of a complete mounting assembly in a modified form of the invention; and, Fig. 9 is side view of Fig. 8.

The mounting assembly of the present invention is one of general utility in that it may be readily adapted for use in a wide range and variety of applications in automobiles, airplanes, boats, etc., wherein it is essential that an apparatus, equipment or other object to be mounted be rigidly and positively supported without danger of damage or subject to rattling and other annoying sounds as a result of shock, vibration and jarring effects and the like. The assembly, otherwise, is adapted for ready removal of the apparatus or equipment from its mounting for any specific use or for maintenance and repair purposes by a quick and easy operation that is more or less obvious to anyone having occasion to dismount the assembly even though not familiar with the same. This, of course, is to great advantage in the mounting of any apparatus which is used in an emergency, such as a fire extinguisher, for example.

While the invention is described with reference to its use as a mounting for a portable oxygen cylinder apparatus or the like, it will be understood that the invention is not limited to this use, but rather, is equally adaptable to various other uses and applications.

Referring now, more particularly, to the drawings, the mounting assembly of the present invention is disclosed, by way of example, in connection with its application and use for removably supporting an oxygen cylinder in an individual diluter demand unit comprising the oxygen breathing apparatus used by aviation personnel in high altitude flying. These units are removably mounted throughout an airplane at the stations of the crew members or passengers in position for ready use when required. After each flight in which they are used, the oxygen cylinders must be removed from the airplane for recharging and complete check-up. Recharged cylinders are stored for general use in any other suitable installation without reference to their original installation inasmuch as they are rarely replaced in the same airplane in which they were originally installed and seldom, if ever, at their original locations. Accordingly, it will be appreciated that the mounting arrangement for the oxygen cylinders must have a more or less universal use to insure that the supporting member for any cylinder is capable of being used with any one of thousands of bracket members installed in airplanes equipped with oxygen breathing apparatus.

The bracket member 1 of the mounting assembly comprises a simple, one-piece, sheet-metal body 2 having a return-bent flange 3 at one end, spaced return-bent flange sections 4 at the other end, and upturned side flanges 5 defining an enclosure for removably retaining an associated article supporting member, as presently to be described. The body 2 is provided with suitable openings for the reception of bolts, screws or other selected fastening means for permanently securing the bracket to a wall member, and of course, may be so attached in any other desired way as by welding, riveting, etc.

Fig. 3 shows the article supporting member, designated generally 10, comprising a central, plate-like base 11 having an offset lower end portion 12 defining a shoulder 13 and an upper end portion 14 carrying a guide pilot in the form of a tongue or projection 15. The projection 15 is designed to pass readily between the return-bent flange sections 4 on the bracket member 1 while the base plate portion 11 is of such width as to be received between the side flanges 5 of the enclosure defined by the flanges 3, 4 and 5 on the bracket member. The supporting member 10, otherwise, is so designed that the distance between the extremities of the upper and lower end portions 12, 14 is greater than the space between the ends of the return bent flange sections 4 and the flange 3 of the bracket, but shorter than the length of the bracket body 2 as necessary for the end portions 12, 14 of the supporting member to be slipped under the flanges 3, 4 of the bracket by a canting operation in which said flanges 3, 4 are disposed in overlapping relation to the end portions 12, 14 of the supporting member in the mounted position of the assembly.

A spring actuated retainer 20 is slidably attached to the upper end portion 14 of the supporting member by means of rivets 21 rigidly fastened to the retainer but freely movable in slots 22 in the supporting member. The heads of said rivets are disposed to the rear of the supporting member to maintain the slidable retainer in assembled relation therewith. Preferably these rivets are applied in this manner with an interposed shim which is withdrawn and thus provides the necessary clearance between the retainer and the supporting member to insure free sliding of the retainer thereon. The sliding retainer includes an abutment 25 extending along its lower end while a lug element in the form of an integral loop, depressed tab, rivet or the like is provided at a point spaced from said abutment, preferably in the manner of an integral hook 26 on the upper end of the retainer, substantially as shown.

A coil spring 30 attached at one end to said hook 26 extends along the guide pilot or tongue 15 and is secured at its opposite end under tension to a rivet or stud 31 on said guide tongue. The coil spring 30 thus maintains the retainer 20 under spring tension at all times with its movement being limited by the rivets 21 engaging the ends of the slots 22, wherefore in its upper, normal position, the retainer is positioned on the supporting member substantially as shown in Fig. 3.

The supporting member is provided with suitable article carrying means such as split bands 35 secured to the base plate by rivets, welding, or the like. In the present example, the free ends of the split bands are provided with bolt and wing nut tightening means 36 for clamping to the support an oxygen cylinder, represented by dotted lines in Figs. 1 and 2, or other article to be removably mounted in an installation by assembling the supporting member 10 to the bracket member 1.

In operation and use, it will be understood that the bracket member 1 is secured to a wall, post, or the like and the article to be mounted suitably attached to the support, as by the split bands 35. The article is then grasped in performing the operation by which the support is applied to the bracket substantially as shown in Figs. 5-7 inclusive. In the initial step shown in Fig. 6, the guide pilot or projection 15 on the support is easily and quickly located in the space between the upper flange sections 4 on the bracket as the support is canted to insert the upper end portion 14 thereof and superposed retainer body 20 under said flange sections 4. As the support is pushed upwardly the free ends of said flange sections 4 engage the abutment 25 of the retainer, whereupon the support slides relatively to the retainer against the force of the coil spring 30 as necessary for the lower end 12 of the support to clear the lower flange 3 of the bracket, as shown in Figs. 2 and 7, and then be seated to the rear of said flange 3 as shown in Figs. 1, 4 and 5. This seating action is more or less automatically effected under influence of the coil spring 30 which is tensioned by the engagement of the abutment 25 with the flange sections 4 and thus tends to pull the support 10 downwardly at all times. This also maintains the lower end 12 of the support in underlapped relation to the flange 3 under influence of the coil spring 30 to prevent any accidental or unintended disengagement of the support from the bracket member in a completed mounting. In this relation, the upper end portion 14 of the support is also disposed in underlapped relation to the flange sections 4 such that in mounted position the support is positively retained by the bracket on all sides.

Removal of the support from the bracket when dismounting of the assembly is desired is accomplished by a reversal of the foregoing described procedure in the steps illustrated in Figs. 5, 7 and 6, respectively.

Figs. 8 and 9 illustrate a modified form of the invention in which the support and bracket members are designed for assembly substantially in the manner of the embodiment just described and comprises a spring means for retaining said members in assembled relation. The bracket member 1' includes an elongated upper portion from which the return bent spaced flange sections 4' are struck and formed on either side of an extension 40 carrying head sections 41. A coil spring 42 bungee cord, or the like is secured to said head sections 41 in any suitable manner, as by rivets 43, and in normal position, extends generally horizontally as illustrated by dotted lines in Fig. 8.

The guide pilot or projection 15' on the article supporting member 10' carries a protruding stud or lug 45 which is adapted to engage the horizontal coil spring 42 when the supporting member is assembled with the bracket member in the manner described with reference to Figs. 1-7 inclusive. Thus, in the final step in the application of the support to the bracket, the stud 45 engages the spring 42 to move the same from its normal, horizontal position, represented by dotted lines, to tensioned position in the inverted V-shape shown in Fig. 8. In this relation, the support is in complete assembly with the bracket, and inasmuch as the coil spring 42 exerts a continuous spring force on the stud 45 in attempting to assume its normal horizontal position, this spring force is transmitted to the article supporting member 10' through the projection 15' to maintain said support in assembled relation with the bracket 1' and thereby prevent any accidental or unintended disengagement of the support from said bracket member in the mounted position thereof in an installation.

While the invention has been described in connection with its use as a mounting assembly for supporting an oxygen cylinder or the like in an installation, it will be quite apparent that it has equal utility in other devices or applications.

It will be understood, further, that the foregoing description and accompanying drawings comprehend only the general and preferred embodiments of the invention and that various changes in the construction, proportion, arrangement and general combination of parts may be made without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

The invention described herein may be manufactured and used by or for the Government of the United States of America for governmental purposes without the payment of any royalties thereon or therefor.

What is claimed is:

1. A mounting assembly comprising cooperating, resiliently connected bracket and support members, said bracket comprising a body having opposed inwardly extending flanges defining an enclosure for the support including a pair of spaced flange sections, said support comprising a base receivable inside and underneath said inwardly extending flanges on the bracket and a projection adapted to pass through the space between said spaced flange sections to facilitate assembly of the support with the bracket member.

2. A mounting assembly comprising cooperating, resiliently connected bracket and support members, said bracket comprising a body having opposed inwardly extending flanges defining an enclosure for the support including a pair of spaced flange sections, said support comprising a base receivable inside and underneath said inwardly extending flanges on the bracket and a projection adapted to pass through the space between said spaced flange sections to facilitate assembly of the support with the bracket member, and means associated with said projection for retaining the support in assembled relation with said bracket.

3. A mounting assembly comprising cooperating, resiliently connected bracket and support members, said bracket comprising a body having opposed inwardly extending flanges defining an enclosure for the support including a pair of spaced flange sections, said support comprising a base receivable inside and underneath said inwardly extending flanges on the bracket and a projection adapted to pass through the space between said spaced flange sections to facilitate assembly of the support with the bracket member, and means associated with said projection exerting a resilient force on the support to maintain the same in assembled relation with the bracket.

4. A mounting assembly comprising cooperating, resiliently connected bracket and support members, said bracket comprising a body having peripheral flanges defining an enclosure for the support including a pair of spaced flange sections, said support comprising a base receivable in said enclosure on the bracket and a projection adapted to pass through the space between said spaced flange sections to facilitate assembly of the support with the bracket member, a retainer slidably disposed on the support over a slot therein, means fastening the retainer to the support through said slot, an abutment on said retainer and a spring connected to the projection and the retainer for causing said abutment on the retainer to engage a flange on the bracket and thereby maintain the support in assembled relation with the bracket.

5. In a mounting assembly comprising resiliently connected bracket and support members, a bracket member comprising a body having opposed inwardly extending flanges defining an enclosure, a support comprising a base receivable inside and underneath said flanges on the bracket, a retainer associated with said support, and means urging the retainer into engagement with the bracket to maintain the support in assembled relation with said bracket.

6. In a mounting assembly comprising resiliently connected bracket and support members, a bracket member comprising a body having opposed inwardly extending flanges defining an enclosure, a support comprising a base receivable inside and underneath said flanges on the bracket, a retainer slidably disposed on said support, and means urging the retainer into engagement with a flange on said bracket to maintain the support in assembled relation with the bracket.

7. A mounting assembly comprising cooperating, resiliently connected bracket and support members, said bracket comprising a body having opposed inwardly extending flanges defining an enclosure for the support, said support comprising a base receivable inside and underneath said flanges on the bracket and a projection receivable in an opening in said bracket, and means engaging said projection for maintaining the support in assembled relation with the bracket.

8. A mounting assembly comprising cooperating, resiliently connected bracket and support members, said bracket comprising a body having opposed inwardly extending flanges defining an enclosure for the support, said support comprising a base receivable inside and underneath said flanges on the bracket and a projection receivable in an opening in said bracket, and resilient means attached to the bracket engaging the projection to maintain the support in assembled relation with the bracket.

HERMAN LOMBARD.

REFERENCES CITED

The following references are of record in the file of this patent:

UNITED STATES PATENTS

| Number | Name | Date |
|---|---|---|
| 1,915,230 | Hooper | June 30, 1933 |
| 2,079,170 | Horsley | May 4, 1937 |
| 2,193,699 | Sadler | Mar. 12, 1940 |
| 2,344,513 | Mapes | Mar. 21, 1944 |